United States Patent Office 3,426,718
Patented Feb. 11, 1969

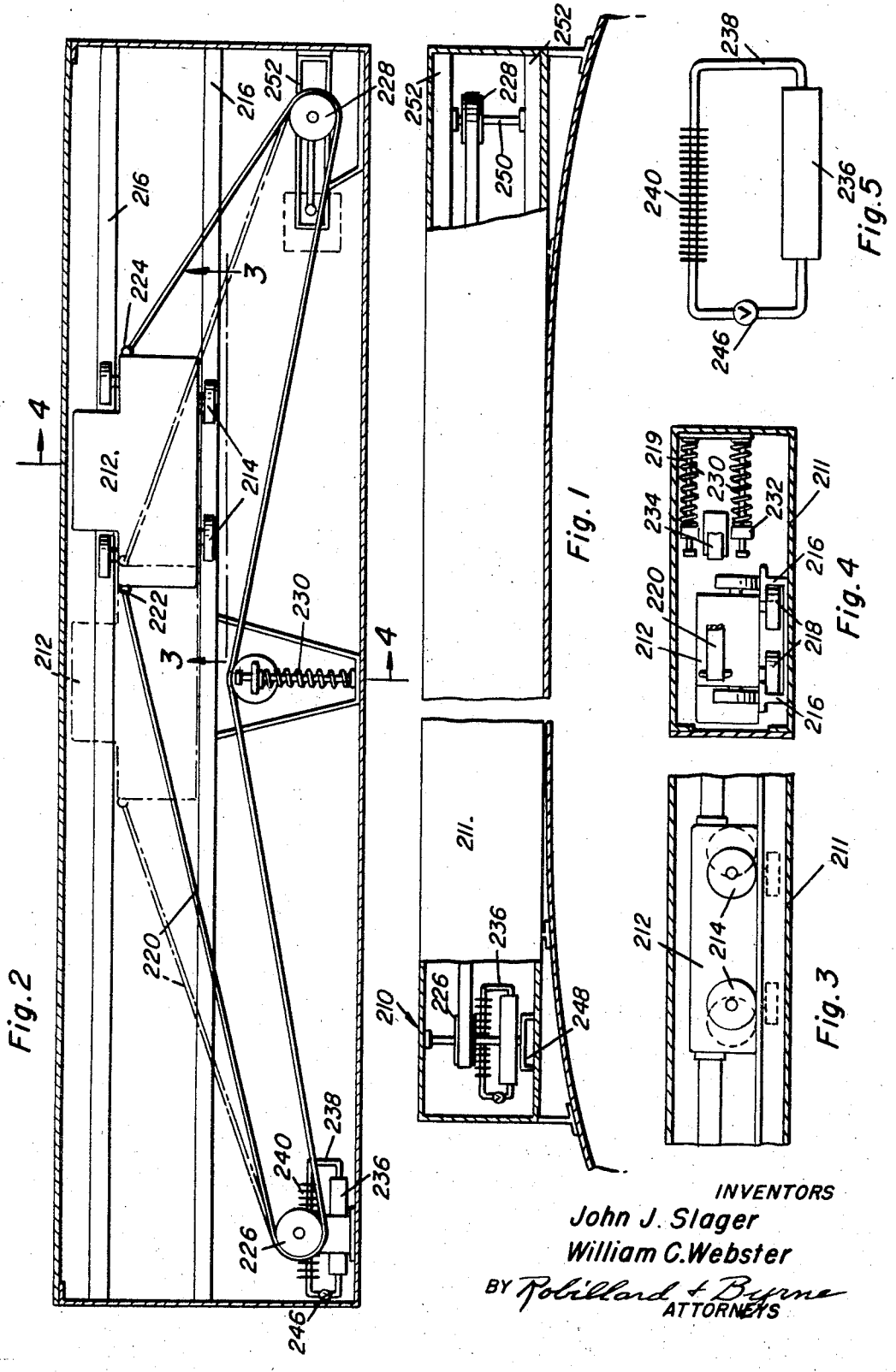

3,426,718
VESSEL STABILIZER
John J. Slager, Silver Spring, and William C. Webster, Glenelg, Md., assignors to Hydronautics, Inc., Laurel, Md., a corporation of Maryland
Original application Sept. 16, 1966, Ser. No. 579,888. Divided and this application Feb. 27, 1968, Ser. No. 714,395
U.S. Cl. 114—124                                4 Claims
Int. Cl. B63b 39/02, 43/08

ABSTRACT OF THE DISCLOSURE

A vessel stabilizer wherein a weighted mass moves upon inclination of the vessel to operate an endless traveler interconnecting its ends including resonant tuned spring means operable through the traveler to exert equal and opposite forces on the weighted mass when centered, and a closed loop pressure establishing means operable by movement of the traveler.

---

This application is a division of application Ser. No. 579,888, filed Sept. 16, 1966, by the same inventors.

The invention disclosed herein relates to a vessel stabilizer, and more particularly to a unitary self-contained, movable weighted mass stabilizer.

It is recognized that both active and passive stabilizers are well known in the art. In recent years considerable development has been pursued in passive type stabilizers, wherein fluid-containing wing tanks are interconnected by a cross-over conduit generally of a particular configuration to cause damping. The work of Frahm on passive stabilizers is well known. The Ripley patents disclose later developments. Ripley U.S. Patent No. 3,083,671 discloses a passive wing-type system and inserts into the cross-over conduit a solid mass of greater density than the water which would otherwise remain in the cross-over.

The development of active systems has not been extensively pursued in recent years. This type of system requires control means which must be very sensitive to ship motion in order to rapidly activate the mechanical anti-roll means. The control problems inherent in such systems, their cost and maintenance, led to the further development of the passive means.

The stabilizer disclosed herein may be considered passive, in that it is activated by the application of an external force, namely; the roll of the vessel. As the roll continues the stabilizer will be inclined in an oscillary manner, and the moving weight will oscillate. Associated with the weight are spring means tuned to cause resonant oscillation of the weight at or near the frequency of oscillation of the unstabilized vessel. Also associated with the weight is a closed system pressure establishing damping means to resist the weight movement and maintain it out of phase with the vessel oscillation. Herein both the tuning and damping means are operably connected to and activated by movement of the weighted mass. Power driven electric, hydraulic, or other control means are thereby eliminated.

The object of the invention is to provide a stabilizer of the above-described type, having a minimum number of parts, which is entirely mechanical in operation, and which may be fabricated as a unitary structure for installation aboard a vessel. The unit may be positioned on the main deck, where it will be readily available for adjusting purposes and does not occupy valuable cargo or storage space. The change required in ship construction is the provision of additional structural strength which may be readily accomplished in new construction, as well as in vessels in service, again without sacrificing space.

Another object is a stabiilzer of small volume and weight, as compared to passive liquid type stabilizers, making the stabilizer particularly suitable for small craft and vessels up to one thousand tons displacement, wherein space is at a premium and added weight undesirable. For example, in a craft displacing approximately sixty-seven tons, the weight of water required in a passive wing-type stabilizer would be approximately double that of the weight herein, and with a movable weight such as disclosed herein, the space occupied is approximately 10 percent of the volume required by water.

The foregoing and other objects and advantages will be apparent from the description herein when read in conjunction with accompanying drawings wherein:

FIGURE 1 is a side view of the stabilizer herein, partly in section;
FIGURE 2 is a top view of the stabilizer of FIGURE 1 with the top of casing removed;
FIGURE 3 is a view taken on the line 3—3 of FIGURE 2;
FIGURE 4 is a view taken on the line 4—4 of FIGURE 2; and
FIGURE 5 is a diagrammatic view of the pressure establishing damping means seen to the left of FIGURE 1.

Referring to the drawings, the stabilizer 210 includes a tube or casing 211, in which the weighted mass, tuning and damping means are arranged in transverse relationship. The stabilizer 210 is positioned and secured to the deck of a vessel in like manner to that disclosed in the parent application.

Herein a substantially rectangular weighted mass 212 having a roller 214 adjacent each corner thereof, rotating on a horizontal axle, supports the mass vertically, for movement on the upper surface of the top web of a pair of T-shaped, spaced parallel tracks 216 which extend lengthwise of the tube 211. The mass further includes four horizontally arranged casters 218 rotatable on vertical axles, which ride on the inner surface of the vertical leg of the T tracks 216 beneath the inner projecting portion of the track top web, thus centering and holding the mass on the tracks.

Associated and operated by the mass 212 is a traveler 220, which forms with the mass an endless loop. The traveler 220 is shown as a flat belt member having one end secured to a vertical bracket 222 on the left end wall of the mass, and its other end to a similar bracket 224, on the opposite end wall. The brackets are positioned in the same horizontal and vertical planes.

As clearly seen in FIGURE 2, the traveler 220 extends from the weight to a sheave 226 adjacent the left end of the tube 211, then across the tube; around a similar sheave 228 adjacent the right end of the tube, and then to the right end of the mass. The sheaves 226 and 228 lie in the same horizontal plane as the mass brackets 222 and 224, and the axis of the sheaves 226 and 228 lies in the same vertical plane, which plane is parallel to that through the mass brackets and spaced laterally therefrom.

With this arrangement, when the mass is centered, as shown in dotted lines in FIGURE 2, the traveler 220 would be taut between the sheaves 226, 228 and the traveler and an imaginary line between the mass brackets 222, 224 define an isosceles trapezoid with base angles equal. When so positioned, any movement of the mass would be insignificant. To permit the mass to move, the length of the traveler is increased and the slack is taken up by a pair of spiral springs 230 (FIGURES 2 and 4) having like physical characteristics, and tuned to the proper resonant frequency. Each spring surrounds a rod 219 having one end secured to the inner surface of the tube 211 front wall, and the other end free. The rods 219 are parallel, of equal length, and their outer ends are enlarged to provide stops. Slidably mounted on the rods is a shaft support 232 on which a sheave 234 is rotatably mounted. The sheave 236 lies in the same horizontal plane as the left- and right-hand sheaves 226 and 228, with its axis in a vertical plane parallel to the vertical plane through the axis of sheaves 226 and 228, but laterally spaced therefrom. The sheave 234 engages the traveler, the slack of the latter being such that the springs 219 are compressed and act through the traveler to exert equal and opposite force on the mass 212 when the mass is centered. Thus, as the weight moves from the center, as for example to the right in FIGURE 2, the left run of the traveler from the mass to the spring means lengthens, and the right run shortens, whereupon the end forces on the mass respectively increase and decrease and the spring means is activated to establish the resonant frequency.

A closed system pressure establishing damping means is operated by movement of the mass, and resists its movement to maintain it out of phase with the roll of the ship. Herein the pressure establishing means comprises a constant volume reverse acting pump 236 of any suitable type, for circulating a lightweight fluid through a closed loop 238 (see FIGURES 2 and 5) and without any free sloshing of the surface area. Installed in the loop is a throttle valve 246 for controlling the rate of flow and therefore, the pressure. The loop 238 may have fins 240 thereon for cooling purposes. The pump 236 is operated by the sheave 226 which is secured to the drive shaft of the pump (thorugh gearing if required), the sheave, as pointed out, being operated by the movement of the traveler upon movement of the mass. The pump 236 is suported by a bracket 248 secured to tube bottom, and the other end of the pump shaft is mounted in a journal on the tube top wall.

In order to adjust the traveler 220, the sheave 228 is mounted on a shaft 250, the opposite ends of which are supported in slide bearings mounted in opposed guides 252, for longitudinal adjustment as required.

From the foregoing, it is seen that mass is the motivating force and becomes operable upon inclination of the stabilizer. The spring resonant tuning means are operably connected between the stabilizer casing and the mass and are activated upon movement of the mass. The pressure establishing damping means become activated upon the movement of the mass and the pressure established is the variable force in that the mass and spring means are constant. Pressure adjustment is accomplished by a single throttle valve in the pressure establishing means.

The stabilizer having been described, the patentable subject matter is set forth in the following claims:

1. A vessel stabilizer including:
    (a) a weighted mass mounted for longitudinal movement,
    (b) a traveler connected to opposite ends of the mass and defining therewith an endless loop,
    (c) means mounting the traveler and so positioned that when the mass is centered, the mass and traveler define a substantially isosceles trapezoid, whereby movement of the mass moves the traveler,
    (d) resonant tuned spring means,
    (e) means between the traveler mounting means operably connecting the spring means to the traveler,
    (f) pressure establishing damping means, and
    (g) means operably connecting the pressure establishing means to the weighted means.

2. The stabilizer of claim 1 wherein the pressure establishing damping means includes:
    (a) a constant volume reversible pump,
    (b) a closed fluid filled loop interconnecting the inlet and outlet of the pump,
    (c) and a throttle valve in the loop.

3. The stabilizer of claim 1 wherein said traveler passes around a pair of sheaves having their axes in a vertical plane parallel to but spaced from a vertical plane through the mass at the traveler connections thereto.

4. The stabilizer of claim 1 wherein said resonant tuned spring means includes:
    (a) a pair of springs,
    (b) a pair of spaced rigid rods on which the springs are mounted,
    (c) a carrier slidable on the rods and engaging the ends of the springs, and
    (d) a sheave rotatable on the carrier.

References Cited

UNITED STATES PATENTS

| | | | |
|---|---|---|---|
| 1,853,069 | 4/1932 | Minorsky | 114—124 |
| 3,083,671 | 4/1963 | Ripley | 114—124 |

TRYGVE M. BLIX, *Primary Examiner.*